Oct. 30, 1962 A. W. BLOW 3,061,687

MAGNETIC DIAL IMPULSE TRANSMITTER

Filed April 16, 1958

INVENTOR.
ANGUS W. BLOW

BY

[signature]
AGENT

United States Patent Office 3,061,687
Patented Oct. 30, 1962

3,061,687

MAGNETIC DIAL IMPULSE TRANSMITTER

Angus W. Blow, Rochester, N.Y., assignor to General Dynamics Corporation, Rochester, N.Y., a corporation of Delaware Filed Apr. 16, 1958, Ser. No. 728,992
6 Claims. (Cl. 179—90)

My invention relates to electrical signaling systems in general, and more particularly to systems for signaling over telephone lines.

In the past it has been the practice to provide dials at telephone stations equipped with mechanically actuated impulsing contacts, the contacts being used for generating trains of directive impulses to be transmitted from the station to the telephone system office switching equipment. Such dials usually have a holed finger plate connected to a main shaft, the main shaft being geared to an actuating cam, which in turn drives the impulsing contacts. The user of the subset manually revolves the finger plate away from its normal position (winds up) and then releases the plate, allowing the plate and main shaft to return to normal position (run down) by power provided from a biasing spring. With this arrangement, it is required that one train of impulses be transmitted for every pair of opposite rotations of the shaft. Therefore, it has been necessary to prevent the operation of the impulsing cams during one such rotation. Present technique dictates that the cam be ineffective during the wind-up operation and thereafter effective during the run-down operation.

The problem of making the device respond in this manner has led to a number of purely mechanical solutions, such as the use of a one-way clutch interposed between the gear train and the actuating cam and the use of auxiliary cams operated only during the wind up for making the actuating cam ineffective. The apparatus embodying these solutions is expensive from the view of original cost and life expectancy because such apparatus is necessarily complex.

Accordingly, it is an object of my invention to provide a new and improved signaling system.

Another object of my invention is to provide a new and improved signaling system suitable for use in telephone systems.

Another object of my invention is to provide a new and improved system for generating directive signals for transmision over a telephone or other line.

Another object of my invention is to provide a new and improved telephone dial.

Another object of my invention is to provide a new and improved telephone dial employing magnets in the impulse generating apparatus.

Another object of my invention is to provide a coupling network capable of distinguishing between different types of spaced apart impulses.

Another object of my invention is to provide new and improved apparatus for use with a telephone dial for distinguishing between signals produced during the wind-up and run-down operations of the dial.

I accomplish these and other objects in the apparatus set forth in the following description. For convenience, reference is made in the following description to the drawings attached to and forming a part of the present specification in which.

Figures 1, 2, 3A, 3B, 4A, 4B:
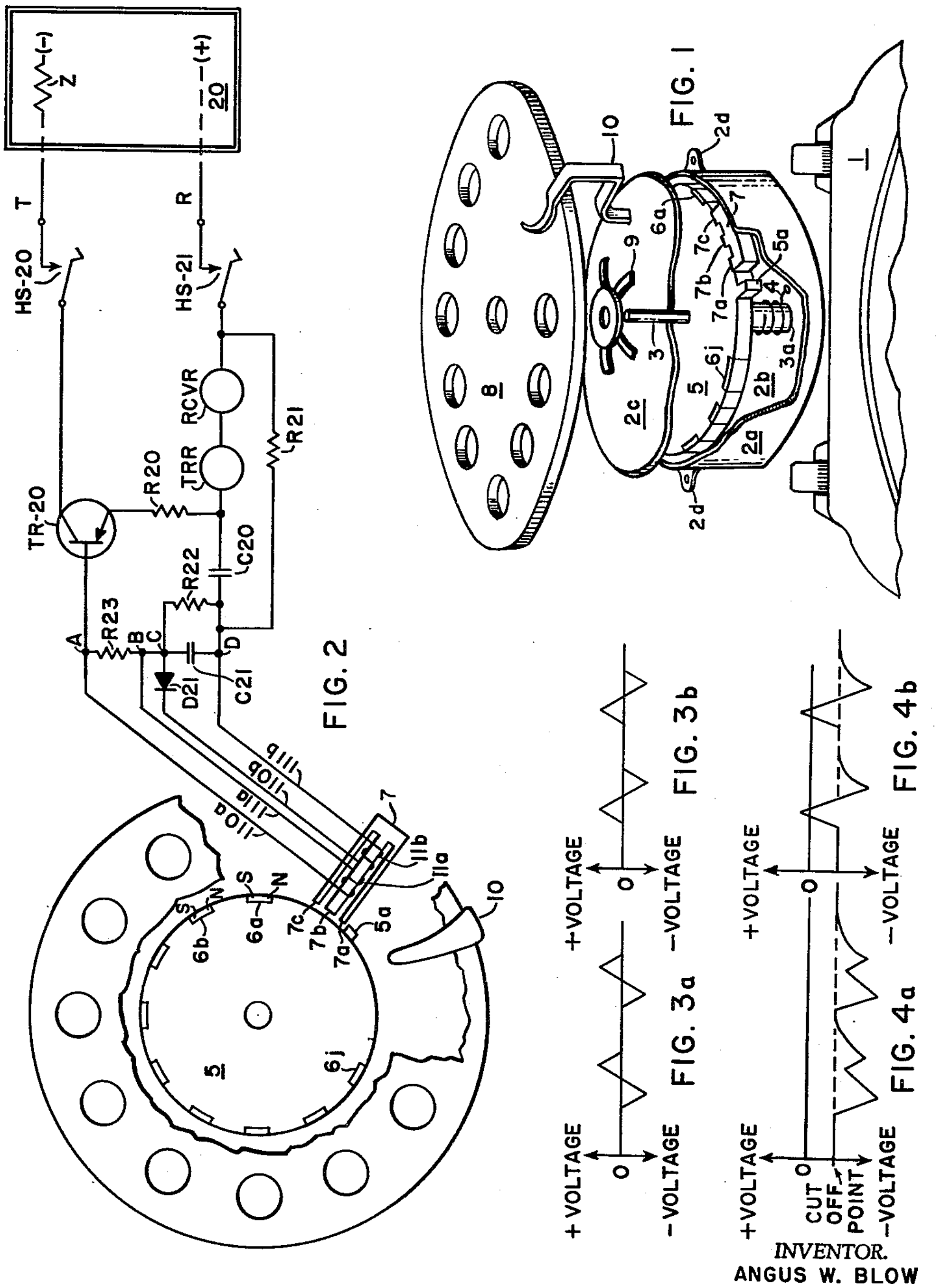
FIG. 1 shows a partially exploded view of a telephone dial.
FIG. 2 shows a schematic diagram of a simplified telephone subset.

FIGS. 3*a*, 3*b*, 4*a*, and 4*b* are curves in which voltage is plotted against angular rotation of a dial.

The power for the apparatus set forth in the following description is drawn from a direct current source such as a battery, the most positive plate or terminal of which is connected to ground; this plate or terminal is hereinafter referred to in the description as "ground" and in the drawings as (+). Similarly, the more negative, ungrounded plate or terminal of the battery is hereinafter refered to in the description as "battery" and in the drawings as (−).

Referring to FIG. 1, a telephone subset is provided with a dial assembly forming a part of the present invention. The dial mechanism is enclosed in a cup-shaped housing having cylindrical wall member 2*a* (shown cut away) and a bottom member 2*b* which may be integral with wall member 2*a*. The housing also includes a top or cover member 2*c* detachably secured to the upper edge of wall member 2*a* by any suitable means. The dial assembly is positioned in the conventional location on subset 1 by passing securing means through openings in ears 2*d* located on wall member 2*a* and openings in corresponding members (not shown) located on the shell of subset 1. Openings in the top and bottom members 2*b* and 2*c* form bearings for receiving main shaft 3 in such a manner that the main shaft is substantially concentric with cylindrical wall member 2*a*. The shaft 3 may be rotated in clockwise and counterclockwise directions as viewed from the top of the dial assembly shown in FIG. 1 within limits and by means to be described presently.

The lower end of shaft 3 adjacent member 2*b* has an enlarged portion 3*a* around which biasing means comprising helical motor spring 4 is wound. The upper end of spring 4 is secured to enlarged portion 3*a*, while the lower end is secured to the cup-shaped housing by any suitable means. Spring 4 is effective for urging shaft 3 to revolve in a counterclockwise direction.

Between the top of enlarged portion 3*a* and the cover member 2*c* of the dial housing, wheel 5 of nonmagnetic material is attached to shaft 3 in such a manner that it is substantially concentric with shaft 3. A plurality of substantially identical magnets 6*a* through 6*j*, are fixed to the periphery of the wheel 5. Each of the magnets is oriented on wheel 5 in such a manner that its major axis is substantially perpendicular to the radius of wheel 5 which intersects the center of the magnet and so that the magnets' poles lie on a common surface, i.e., the periphery of wheel 5 and in a plane parallel to the planes defined by the top and bottom surfaces of wheel 5. The magnets are further oriented so that they are equally spaced apart from each other around a portion of the periphery of wheel 5 and so that ends of adjacent magnets are of opposite polarity to each other. This relationship is best illustrated in FIG. 2, wherein the lower ends of magnets 6*a* and 6*b* are north poles, while the upper ends of the same magnets are south poles.

A coil assembly including an E-shaped core 7 of magnetic material is carried on wall member 2*a* of the dial housing and disposed so that its pole faces 7*a*, 7*b* and 7*c* formed at the free ends of the first outer, middle and other outer legs, respectively, are adjacent to the periphery of wheel 5. The centers of faces 7*a*, 7*b* and 7*c* are spaced apart from each other by a distance substantially equal to the length of each of the magnets 6*a*, 6*b*, etc., so that any one of the magnets may be placed opposite pairs of faces 7*a*—7*b* and 7*b*—7*c* as wheel 5 is revolved around its own axis. Magnets 6*a*, 6*b* etc., are spaced apart from each other on the periphery of wheel 5 by a distance substantially greater than the length of any one of the magnets. This separation insures that only one magnet at a time may be placed opposite either pair of pole faces. The coil assembly also includes windings $11a$ and $11b$ on the inner leg of core 7 as shown in FIG. 2.

Returning to FIG. 1, a finger plate 8 is attached by any suitable means such as a fingered washer 9, which is keyed or otherwise fixed to the end of shaft 3 emerging from the dial housing top member $2c$. Openings or other indicia are provided around the edge of plate 8 for receiving an operating device or the finger of the user of the subset and allow the user to revolve the rotor assembly including plate 8, shaft 3, and wheel 5 in a clockwise direction. Each index on plate 8 corresponds both in number and in position relative to shaft 3 to one of the magnets $6a$, $6b$, etc., set in the periphery of wheel 5. The aforementioned rotor assembly has a normal position into which it is urged by spring 4, the position being determined as that point at which a detent on the rotor assembly, such as projection $5a$ on wheel 5 contacts a corresponding point on the dial housing. In the preferred embodiment of my invention, the dial housing detent is the left-hand end of core 7. With this arrangement, when wheel 5 and shaft 3 may be rotated less than 360° until projection $5a$ engages another stop member, such as the right-hand end of core 7, thereby limiting the angle through which the rotor assembly may be revolved.

In order to stop the clockwise rotation of the rotor assembly at a predetermined point short of the one where $5a$ engages the right-hand end of core 7, a finger stop 10 carried on wall member $2a$ is positioned so that its upper portion overhangs the upper surfaces of plate 8. With this arrangement, the rotor assembly can be rotated until the finger of the user inserted in any one of the plate 8 openings encounters the overhanging portion of finger stop 10. Thereafter the user removes his finger from the plate 8 opening, allowing the rotor assembly to be returned in a counterclockwise direction to normal position.

With the above described relationships between the lengths of magnets $6a$, $6b$, etc., and the spacing between faces $7a$, $7b$ and $7c$ of core 7, movement of the rotor assembly away from normal position in a counterclockwise direction (a wind-up operation) is effective for causing each of a corresponding number of magnets $6a$, $6b$, etc., to be passed first across face pairs $7c$—$7b$, and then $7b$—$7a$ in the order named. The above described finger stop 10 is positioned on member $2a$ so that the last of the magnets so moved comes to rest with its south pole moved beyond face $7a$. Subsequent release of plate 8 by the user of the dial allows the rotor assembly to complete its run-down operation to normal position in a counterclockwise direction. In this manner, the same ones of the magnets moved across the face pairs of core 7 during the wind-up operation are moved across the face pairs in an opposite order and direction during the run-down operation.

During the wind-up operation as each magnet is moved past a first pair of pole faces $7c$—$7b$ and the north pole of each magnet is substantially opposite face $7b$, flux passes through the center leg of core 7 in a first direction during the time that the other end of the same magnet is opposite face $7c$. The change in flux density in the center leg resulting from the movement of the magnet to this point and slightly beyond is effective to induce a first portion of a voltage impulse in each of windings $11a$ and $11b$. Referring to FIG. 2, terminal conductors $110b$ and $111a$ are at a negative potential with respect to terminal conductors $110a$ and $111b$, respectively, during this first impulse portion. Further rotation of the assembly in the same direction to the point where the same magnet is moved past a second pair of pole faces $7b$—$7a$ and the second (south) pole of the magnet is substantially opposite face $7b$, and the magnet is thereafter moved beyond face $7a$, the magnet is effective for reversing the direction of flux flow in the center leg of core 7. The movement during this reversed flux flow and the resulting change in flux density in the center leg of core 7 is effective to induce a second portion of the voltage impulse in each of windings $11a$ and $11b$, the polarity of the second portion being opposite to that of the first portion. In this manner, a series or train of voltage impulses at the terminals of windings $11a$ and $11b$ is created during the wind-up operation. Such impulses have an outline substantially as shown in FIG. $3a$, in which voltage generated in either of windings $11a$ and $11b$ is plotted against the angular rotation of the rotor assembly.

During the ensuing run-down operation, voltage impulses equal in number to the impulses in the preceding wind-up impulse series and having positive and negative portions are also induced in windings $11a$ and $11b$. The positive and negative portions of the run-down impulses occur in an order opposite from the order of the portions generated during the wind-up operation. FIG. $3b$ shows a representation of a series of impulses generated during a run-down operation as plotted against angular rotation of the rotor assembly.

From FIGS. $3a$ and $3b$, it is obvious that each wind-up and run-down operation of the dial is effective for synchronously generating first and second trains of equal numbers of spaced apart impulses in windings $11a$ and $11b$, respectively. Each impulse generated has both positive and negative portions, the wind-up operation impulses being distinguishable from the run-down operation impulses in that the first occurring portion of each wind-up impulse is of negative polarity and opposite to the corresponding positive first portion of each run-down impulse. If it is assumed that the angular velocity of the rotor assembly is constant during wind-up and run-down operations, each impulse in a train generated in the above described manner is substantially identical to other impulses in the same train, and the impulses in any one train are equally spaced apart in time from each other. It will be obvious to those skilled in the art that a dial governor of any of the well-known types could be employed to assure constant velocity of rotation.

Referring to FIG. 2, the dial described in the foregoing paragraphs may be incorporated in a signaling system, wherein it is desired to control an external circuit such as a telephone line extending to a telephone office. In such a system, signal generating means such as a dial located at a telephone station connected to the end of the line remote from the office is used for generating trains of signals to be transmitted over the line to the office. In FIG. 2, I show a telephone line comprising conductors T and R extending to and terminating at central office 20. Conductor T is connected through load Z to battery, and conductor R is connected to ground within office 20.

The telephone subset which is shown in simplified schematic arrangement of components has transmitter TRR, receiver RCVR, control means including transistor TR20, and a dial of the above-described type. The subset is connectible to the end of the line remote from office 20 by conventional means including subset hookswitch contacts HS20 and HS21. In the configuration shown in FIG. 2, transmitter TRR and receiver RCVR are connected in series with each other, and the combination is in turn connected through the emitter and collector of transistor TR20 to the left-hand side of contacts HS20 and HS21. When the telephone handset has been removed from its cradle and the output section of transistor TR20, i.e., the collector and emitter, is operative, current flows in the external circuit from ground through conductor R, now closed contacts HS21, receiver RCVR, transmitter TRR, resistor R20, the collector and emitter of transistor TR20, now closed contacts HS20, conductor T, and load Z to battery. Current flowing through the above-traced circuit is effective to control conventional supervisory and signaling apparatus (not shown) in office 20, and, if necessary, to energize transmitter TRR at the substation.

Transistor TR20 is shown as a PNP type and passes current over the above-traced circuit when its base is maintained negative with respect to the emitter. In order to maintain transistor TR20 normally conducting when the handset is connected in the above described circuit, the base of transistor TR20 is self-biased with respect to the emitter by a circuit traced from the left-hand side of contacts HS21 through resistors R21, R22 and R23 to the base of transistor TR20.

When the above described dial is operated through wind-up and run-down operation, it is desired to transmit signal over the external line only during one such operation. In keeping with present telephone design practice, I have arranged the apparatus forming the preferred embodiment of my invention to transmit control impulses over the line during the run-down operation only. In order to make the dial effective with respect to the external circuit, I provide a network comprising resistors R22 and R23 and capacitor C21 coupling windings 11*a* and 11*b* of the dial to the input of the control means including transistor TR20. The network is effective for applying certain of the impulses generated in windings 11*a* and 11*b* across the base and emitter of transistor TR20 and for suppressing the remainder of the impulses generated in the windings with respect to the input of the transistor in the manner to be described.

The above referred to network comprising an upper half lying between points A and B and including resistor R23 is directly coupled to winding 11*a* of the dial. The lower half of the network, lying between points C and D and including resistor R22 and capacitor C21 connected in parallel is coupled by means including diode D21 to winding 11*b* of the dial. The network is coupled at points A and D to the base and emitter of transistor TR20 by means comprising blocking capacitor C20. With this arrangement, voltage from windings 11*a* and 11*b* applied to the input of transistor TR20 is the sum of the dial-generated voltages present across the upper and lower network halves.

Referring to FIGS. 4*a* and 4*b*, the negative voltage between the emitter and base of transistor TR20 is normally maintained at or close to the cutoff point (i.e., barely sufficient to cause transistor TR20 to pass current in the external circuit in the above described manner). Any other voltage source connected between the base and emitter which drives the base more negative with respect to the emitter causes no interruption in the current passed between the emitter and collector of transistor TR20 and the external circuit. Conversely, a signal applied between the base and emitter of transistor TR20 which drives the base-emitter voltage positive with respect to the cutoff voltage indicated in FIGS. 4*a* and 4*b* is effective for interrupting the flow of current in the emitter-collector circuit and, therefore, in the external circuit including the line. While my description is confined to the single case where the normal flow of current in the external circuit is interrupted to form impulses, it will be obvious to those skilled in the art that the apparatus could easily be modified to transmit impulses of current over a line which is normally noncurrent carrying or "dry."

During the wind-up operation of the dial, the negative first half of each voltage impulse generated in winding 11*b* is applied through diode D21 to means comprising capacitor C21 for storing negative parts of impulses generated in winding 11*b*. During the same interval, the negative first half of each voltage impulse generated in winding 11*a* is applied to means comprising resistor R23 for adding the voltage output of winding 11*a* to the voltage present on the storing means. The voltages across the upper and lower halves of the network and resistor R20 are added as indicated in FIG. 4*a*. During the second, positive half of the same impulse, the voltage applied to resistor R23 by winding 11*a* is positive. However, means comprising diode D21 blocks the corresponding positive impulse portion from winding 11*b* at this time. During this half of the voltage impulse, the charge previously stored on capacitor C21 during the first impulse portion leaks off through discharge means comprising resistor R22. For this reason, the sum of the voltages across points A and B of the network which is applied to the base and emitter of transistor TR20 during the second, positive half of impulses generated in windings 11*a* and 11*b* is negative with respect to the bias voltage applied to the base of transistor TR20. Under these conditions, the network effectively suppresses impulses having negative first portions and positive succeeding portions. The values of capacitor C21 and resistor R22 are chosen so that the charge placed on capacitor C21 during any one impulse portion is reduced to substantially zero by the time that the next voltage impulse is received. Transistor TR20 continues to pass current in the external circuit until the wind-up operation has been completed and the run-down operation has been started.

During the corresponding run-down operation of the dial, the first positive half of each voltage impulse generated in winding 11*a* is applied between points A and B of the network. During the same half of the impulse, the voltage generated in winding 11*b* is blocked by diode D21, so that the positive voltage from winding 11*b* is not applied across points C and D of the lower network half. As shown in FIG. 4*b*, the voltage measured between points A and D of the network during this first, positive impulse portion is effective to make the voltage between the base and emitter of transistor TR20 positive with respect to the cutoff voltage, so that transistor TR20 ceases to pass current between its emitter and collector and current in line conductors T and R is interrupted.

During the second half of the cycle, voltage generated in winding 11*a* is applied to the upper half of the network, and diode D21 passes the voltage signal generated in winding 11*b* to the lower half of the network. The sum of these voltages, as indicated in FIG. 4*b*, is effective for again raising the value of the negative voltage applied to the base and emitter of transistor TR20 to the point where it is negative with respect to the cutoff voltage value. At the end of the voltage impulse, the charge from winding 11*b* stored on capacitor C21 again decays to substantially zero before the next voltage impulse is received from windings 11*a* and 11*b*. In this manner, the network passes impulses having first positive portions from windings 11*a* and 11*b* to the input of transistor TR20, and the application of impulses to the input results in a corresponding series of interruptions in current flow in the external circuit comprising conductors T and R.

While I have shown and described the preferred embodiment of my invention, other modifications of my teachings will readily occur to those skilled in the art. I therefore aim in the appended claims to cover all such modifications as fall within the true spirit and scope of my invention.

What I claim is:

1. In a telephone dial, a wheel, means comprising shaft fixed to and concentric with said wheel for moving said wheel in first and opposite directions, a plurality of substantially identical magnets having spaced apart poles lying on the periphery of said wheel, a coil assembly comprising an E-shaped core and a winding positioned on the middle leg of said core, each of the leg ends of said core forming a face disposed adjacent to the periphery of said wheel, said moving means being effective for causing the poles of each of said magnets to pass a first pair of said faces including the face formed at the end of the middle leg of said core and thereafter past a second pair of said faces including the face formed at the end of said middle leg of said core whereby the direction of flux in the middle of leg of said core is reversed as each of said magnets is passed opposite the pole face pairs and produces impulses having first and second portions of opposite polarities in said winding.

2. In an impulse transmitting system; means having an output for controlling an external circuit and an input operative in response to the application of positive voltage signals for making said output operative; means for generating first and second trains of spaced apart voltage impulses, each impulse in both trains having successive first and second portions of opposite polarities; said generating means being operative in first and second opposite manners for producing impulses having negative and positive first portions respectively; a network comprising means coupled to said generating means for storing negative portions of individual ones of first train impulses, means for discharging said storing means between each successive first train impulse, and means coupled to said generating means for adding the second train voltage impulses to the voltage across said storing means; and means coupling said network to said input for applying the sum of the voltages across said storing means and said adding means to said input, whereby said control means is responsive to trains of impulses having positive first portions and unresponsive to trains of impulses having negative first portions.

3. In an impulse transmitting system; means having an output section operative between first and second conditions for controlling an external circuit and an input coupled to said output for normally maintaining said output in first condition and responsive to positive voltage signals for driving said output to second condition; means for generating first and second trains of spaced apart voltage impulses, each impulse in both trains having first and second portions of opposite polarities; said generating means being operative in first and second opposite manners for producing impulses having negative and positive first portions respectively; a network comprising means coupled to said generating means for storing individual first train impulses, means operative between each of said first train impulses for discharging said storing means, and means coupled to said generating means for adding the voltage of each of said second train impulses to the voltage present on said storing means; means comprising a diode coupling said generating means to said storing means for causing only the negative portions of first train impulses to be passed to said storing means, and means coupling said network to said input for applying the combined voltages present on said storing means and said adding means to said input, whereby said output section is driven from first to second condition only in response to impulse from said generating means when said generating means is operated in said second manner.

4. In an impulse transmitting system; a telephone subset having means for controlling the flow of current over an external line; an input coupled to said control means for normally maintaining said control means in conducting condition and responsive to the application of positive voltage for causing said control means to stop current from flowing in said line; a dial having first and second windings for generating first and second trains of spaced apart voltage impulses, respectively, each impulse in any train having first and second portions of opposite polarity; said dial being operative through a wind-up and opposite, run-down movement for producing trains of impulses having negative and positive first portions, respectively, in said windings; a network comprising means coupled to said first winding for storing negative portions of each impulse produced in said first winding, means for discharging said storing means between successive first train impulses, and means coupled to said storing means for adding the voltage registered on said storing means to the voltage of impulses generated in said second winding; and means for applying the sum of the voltages across said storing means and said adding means to said input; whereby said control means is effective to interrupt the flow of current in said line only during a run-down operation of said dial.

5. In combination, a matrix containing a plurality of magnets having spaced apart poles arranged in a head to tail relationship, a magnetic pickup head positioned adjacent said matrix for generating a first train of impulses of a first type when said matrix and said pickup head are moved relative to one another in a first direction, the length of said first train being proportional to the relative movement of said matrix and said pickup head in said first direction, and for generating a second train of impulses of a second type when said matrix and said pickup head are moved relative to one another in a second direction, the length of said second train being proportional to the relative movement of said matrix and said pickup head in said second direction, and means for causing a selectively variable relative motion between said matrix and said pickup head.

6. The combination as set forth in claim 5 wherein means are provided for coupling the output of said magnetic pickup head to a transmission line, said means for coupling further including means for passing said train of impulses of a first type and for preventing the passing of said train of impulses of a second type.

References Cited in the file of this patent

UNITED STATES PATENTS

| | | |
|---|---|---|
| 2,306,267 | Kalb | Dec. 22, 1942 |
| 2,319,321 | Head | May 18, 1943 |
| 2,319,937 | Mathes | May 25, 1943 |
| 2,410,833 | Meacham | Nov. 12, 1946 |
| 2,543,014 | Grace | Feb. 27, 1951 |
| 2,597,898 | Parkinson | May 27, 1952 |
| 2,771,505 | Avery et al. | Nov. 20, 1956 |
| 2,855,585 | Quinby | Oct. 7, 1958 |
| 2,926,335 | Bower | Feb. 23, 1960 |

FOREIGN PATENTS

| | | |
|---|---|---|
| 522,896 | France | Apr. 8, 1921 |